United States Patent Office 2,953,586
Patented Sept. 20, 1960

2,953,586

METHOD FOR PREPARING ORGANO-METALLIC COMPOUNDS

Walter Hafner, Munich, and Ernst Otto Fischer, Munich-Solln, Germany, assignors to Union Carbide Corporation, a corporation of New York No Drawing. Filed Oct. 1, 1956, Ser. No. 612,962

Claims priority, application Germany Oct. 5, 1955

21 Claims. (Cl. 260—429)

This invention relates to organo-metallic chemical entities and to a process for their production. The organo-metallic chemical entities to which the invention pertains are more particularly complexes, comprising neutral compounds and cations, which are aromatic organic compound-transition element addition complexes. The invention includes correlated improvements and discoveries whereby the production of such complexes is conveniently and effectively achieved.

It is a principal object of the present invention to provide organo-transition element addition product chemical entities of both ionic and non-ionic nature wherein an aromatic organic molecule is held in chemically bound relation to a transition element.

A further object of the invention is to provide processes whereby aromatic organic compounds may effectively be united in chemically bound relation with a transition element to form ionic and non-ionic chemical entities. Another object is to provide a process for securing the addition reaction of a transition element with an aromatic organic compound having at least one benzene ring free of another benzene ring fused thereto in conjugated relation with the first benzene ring.

A still further object of the invention is to provide water-soluble organo-metallic cations which contain aromatic compounds as the organic component and transition elements as the metallic component. An additional object is to provide organic solvent-soluble organo-metallic compounds which contain aromatic compounds as the organic component and transition elements as the metallic component.

Still further objects of the invention are to provide a process for production of such organo-metallic cations and a process for the conversion of such cations into organo-metallic compounds having no ionic charge.

Other objects of the invention will in part be obvious in the light of the disclosure herein and will in part appear hereinafter.

The organo-metallic compounds of this invention may, from the point of view of their organic moiety, be characterized as addition compounds in contrast to organo-metallic substitution compounds wherein a hydrogen or other substituent in the organic nucleus is substituted or removed in formation of an organo-metallic compound. Thus the compounds of the present invention are to be distinguished from those formed by the chemical bonding of a cyclopentadienyl radical with an element (Fischer and Pfab, Zeit. fur Naturforschung, 7b, page 377, 1952), and phenyl mercury compounds, e.g. phenyl mercuric acetate (U.S. Patent 2,502,222). Formation of such substitution compounds involves elimination of one hydrogen on the cyclopentadiene or benzene nucleus. In the case of the compounds of the present invention the chemical union of the transition element with the aromatic compound does not involve elimination of hydrogen or any other substituent on the benzene nucleus. It may therefore be regarded as an addition product of the transition element with the aromatic organic molecule. Such addition of an aromatic compound to a transition element is an unexpected characteristic of aromatic compounds.

The chemical entities of this invention comprise both a cationic entity and an entity without ionic charge. The cationic entity may be recovered as a compound wherein the cation is held in bound relation with a large variety of anions. The cationic form may be converted into the form having no ionic charge and vice-versa by reduction and oxidation as is more particularly described hereinafter.

The method of the present invention involves generally reacting an anhydrous transition element salt, preferably a transition element halide in the presence of an anhydrous aluminum halide with an aromatic compound having at least one isolated benzene ring system. As employed in this application the term "isolated benzene ring system" means a benzene carbon ring contained in a fused ring compound containing a benzene carbon ring wherein, by the Kekule formulation, any double bond in a ring fused to such benzene carbon ring is removed from the benzene ring atom nearest to it by at least two carbon atoms of the ring fused to the benzene ring, and a compound having one or more aliphatic substituents on a benzene ring wherein any double bond external to the carbon ring is removed from the benzene ring carbon atom nearest to it by at least two carbon atoms external to such benzene carbon ring. Thus, benzene, alkyl substituted benzenes, aralkyl substituted benzenes, indane, tetrahydronaphthalene, 9,10-dihydroanthracene, 9,10-dihydrophenanthrene and allyl benzene are examples of aromatic compounds containing an isolated benzene ring system. By contrast naphthalene, indene, anthracene, phenanthrene and styrene are examples of aromatic compounds which do not contain an isolated benzene ring.

The inapplicability in the present invention of compounds which do not contain an isolated benzene ring, as contrasted with the applicability with compounds which do contain such a ring, results from essentially different characteristics of the two types of compounds with respect to their aromatic nature. The fusion of a benzene ring to another aromatic ring in conjugated relation thereto, or linkage of a ring carbon atom of a benzene ring to an unsaturated aliphatic radical wherein the ring carbon is linked to an aliphatic carbon atom which in turn is linked by a double bond to another aliphatic carbon atom, may be considered as orienting the double bonds in the benzene ring, thus producing a ring structure of less reactivity than is characteristic of an isolated benzene ring and rendering the electrons in the double bonds of the benzene ring unavailable for reaction with the transition element halides. This essential characteristic may also be explained upon energy considerations. The fusion of an aromatic ring to the benzene ring in conjugated relation and the inclusion of an unsaturated aliphatic radical on the benzene ring with the unsaturation in the aliphatic constituent being in conjugated relation with double bonds in the benzene ring may be considered as decreasing the energy and concomitantly increasing the stability of the ring to such a point that the compounds are unreactive for the purposes of this invention.

We have found that, surprisingly and unaccountably, the process of this invention may also be utilized employing aryl substituted aromatic hydrocarbon compounds as, for example, polyphenyls such as diphenyl, phenylnaphthalene, phenylanthracene and phenylphenanthrene, although they do not contain an isolated benzene ring.

The chemical entities of this invention may be designated by the empirical formula $$(Ar)_2M(Y)$$

wherein Ar represents an organic hydrocarbon compound containing an isolated benzene ring, M is a transition element and Y represents the ionic charge of the chemical entity and may be 0, I and II. When Y is 0 the chemical entity is an uncharged or non-ionic compound. When Y is either I or II the chemical entity is in ionic form, being a cation.

The reaction between a transition element halide and an aromatic organic hydrocarbon compound containing an isolated benzene ring according to the present invention may be illustrated by the reaction of $CrCl_3$ with benzene in the presence of aluminum chloride and aluminum metal. Such reaction may be represented as follows:

$$3CrCl_3 + 6C_6H_6 + AlCl_3 + 2Al \rightarrow 3[Cr(C_6H_6)_2]^+ + [AlCl_4]^-$$

The reaction is carried out in anhydrous organic liquid reaction media furnished by an excess of hydrocarbon reactant or an inert organic liquid. The aluminum metal, preferably employed as powder, serves as a reducing agent to effect reduction of Cr(III) to a lower valence state. The product is a salt-like complex consisting of the cation $[Cr(C_6H_6)_2]^+$, and the anion $[AlCl_4]^-$. The ionizable complex, which is water soluble, may be recovered as a yellow compound, bis(benzene) chromium tetrachloroaluminate, having the formula $$Cr(C_6H_6)_2AlCl_4$$

and being a lustrous yellow crystalline substance readily soluble in water.

The water soluble cationic portion, $Cr(C_6H_6)_2^+$ may be reacted with various anions and the resulting compounds recovered. With a number of anions the cationic entity forms salt-like compounds having low solubility in water. Examples of salts of the cation which are relatively insoluble in water are iodide, perchlorate, picrate, tetraphenylboron derivative, Reineckate, anions of metal carbonyl hydrides, cyclopentadienyl metal carbonyl hydrides. Reaction of the cationic entity with various other anions results in products of varying solubility in water.

The cationic entity may be converted into an ionically uncharged compound by treatment with reducing agents. Prior to such conversion of the cation to non-ionic form, it is generally preferred to remove excess aluminum halide. This may be accomplished by employment of hydrolysis procedures known to the art. This reaction being exothermic, care should be taken to control the rate of evolution of heat. Thus, alcohol may be added to the reaction mixture containing aluminum halide and the cation-aluminate complex. If desired, water may subsequently be added to insure hydrolysis of the alcoholate. Such treatment also decomposes the halogenoaluminate anion component of the complex and the aluminum comprised both in the aluminum halide and in the aluminate anion is precipitated as aluminum hydroxide, preferably by the addition of an alkaline material, such as potassium hydroxide, while unreacted transition element halide is also similarly decomposed and the transition element precipitated as the hydroxide. The hydrolysis does not affect the organo-metallic cation.

Another procedure, which may be utilized, is one in which the hydrolysis steps and reduction of the cation are carried out simultaneously. Thus, when aluminum or zinc has been used as the reducing agent in production of the cation and excess metal remains, an alkaline hydroxide, for example KOH, may be added in the case of aluminum and dilute acetic acid or water may be added in the case of zinc. In these cases hydrolysis takes place and sufficient hydrogen is released to effect reduction of the cation.

An alternative procedure may often be employed to advantage, particularly where the cation is markedly stable in alkaline solution, of which the $(Ar)_2Cr^+$ cation is an example. In this alternative procedure an excess of alkali is added following the hydrolysis to solubilize the aluminum as the aluminate. In such case, reduction and isolation procedures may be carried out on the reaction mixture without removal of the dissolved metal ions. Such procedure is not preferred, however, where the cation is relatively unstable in alkaline solution, as is the $(Ar)_2Fe^{++}$ cation. In the case of such cations, neutral or weakly acid conditions are preferred.

Following removal of the precipitated metal hydroxides the resulting reaction mixture containing the organo-metallic cation may be treated with a reducing agent to convert the cation to non-ionic material. In the case of the dibenzene chromium cation the reaction, utilizing sodium hydrosulfite as the reducing agent, may be represented as:

$$[Cr(C_6H_6)_2]^+ \xrightarrow{Na_2S_2O_4} Cr(C_6H_6)_2$$

It is preferred that this reducing agent be employed in a reaction medium which contains a base as, for example, NaOH, KOH, or $NH_4OH$. Various reducing agents may be employed to effect the reduction of the cationic organo-metallic entity to the non-ionic form. In addition to sodium hydrosulfite one may, for example, employ hydroxylamine, hydrazine, hydroxymethylene sulfinic acid, formamidine sulfinic acid, zinc and dilute acetic acid, and aluminum and alkali metal hydroxide.

Upon hydrolysis of the reaction product containing the cationic organo-metallic entity there results an aqueous phase and an organic phase and a precipitate of aluminum and transition element hydroxides resulting from decomposition of excess aluminum halide and the aluminum-containing anion of the transition element. The precipitates are removed by filtration and the cationic organo-metallic entity is contained in the aqueous phase. The treatment of this two-phase solution with a reducing agent results in reduction of the organo-metallic cation to a non-ionic form which is insoluble in water but soluble in benzene and other organic solvents. The non-ionic compound may be recovered from the organic solvent phase by evaporation of the solvent and may be further purified by distillation or sublimation under high vacuum.

The organo-metallic cations impart distinctive coloration to aqueous solutions containing them and compounds formed by combination of the various anions with the organo-metallic cations are similarly colored. Progress of the reaction to form the cation is hence often evidenced by color changes. Similarly, the non-ionic compounds are distinctively colored.

In conducting the reaction of transition element halides with the aromatic compounds to form the organo-metallic cation in the presence of an aluminum halide, the presence of a reducing agent is essential in all cases where the stable form of the organometallic cation is of lower valence than that of the transition element in the transition element halide. Thus, the cation, $(Ar)_2Fe(II)$ has a valence of two. When an Fe(III) halide is employed, the presence of a reducing agent is essential to reduce the iron to a valence of two, which is its valence in the cation. However, when using an Fe(II) halide, as, for example, $FeBr_2$, no reduction is required and hence no reducing agent need be included.

In lieu of an aluminum halide an aluminum compound which decomposes under the conditions of the reaction to form aluminum halide may be employed. For example, in the presence of the aromatic and transition element reactants, triethyl aluminum serves to reduce the transition element halide and to provide aluminum halide, thus being a source both of the aluminum halide and the reducing agent.

As a reducing agent in this phase of the reaction it is preferred to employ an element above antimony in the electromotive series. Of such elements iron, chromium, zinc, manganese, aluminum and magnesium are particularly preferred. It is also preferred to employ as the reducing agent an element which in the electromotive series is above the transition element employed.

In lieu of a metallic reducing agent, certain of the reactants may serve as the reducing agent. Thus, tetrahydronaphthalene which serves as a suitable aromatic hydrocarbon reactant containing an isolated benzene ring serves also as a reducing agent. In those instances where one of the reactants thus serves a dual purpose both as a reactant and as a reducing agent, it is preferred to supply such reactant in considerable stoichiometric excess.

The reaction between the aromatic compound and the transition element halide is carried out under anhydrous conditions in an organic liquid reaction medium, and when the aromatic compound is a liquid, a stoichiometric excess is conveniently employed to provide a suitable liquid reaction medium. However, the reaction may also be carried out employing only a stoichiometric equivalent of the aromatic compound and organic liquids inert to the aromatic compound, the aluminum halide and the transition element halide as well as reaction product may be employed, as, for example, paraffin hydrocarbons such as hexane, heptane, dodecane, cyclohexane and paraffin petroleum fractions.

The temperatures at which reaction of the aromatic compound with the transition element halide are carried out may be varied over a considerable range, the process being applicable over the temperature range of —50° C.–300° C. Room temperature or lower is often satisfactory but in the interest of increasing the rate of reaction elevated temperatures are preferred. However, temperatures in excess of the decomposition temperature of the product should be avoided. We generally prefer to employ temperatures within the range of 40°–150° C. Where temperatures in excess of the boiling point of the organic reactant or organic liquid reaction medium are employed, the reaction may be carried out under pressure in excess of atmospheric pressure to maintain a liquid phase. Where desired the reaction may also be carried out under pressure less than atmospheric, so long as liquid phase reaction conditions are maintained.

Normally solid aromatic compounds may be employed as reactants in production of the organo-metallic cation by heating the reaction mixture to or above the melting point of the aromatic compound and thus conducting the reaction in liquid phase.

It is preferred to carry out the reactions for formation of the cation as well as subsequent steps of hydrolysis, reduction to the non-ionic form and also reaction of the cation with various anions in the absence of air under a protective atmosphere of inert gas such as nitrogen, argon and krypton.

The time employed for carrying out the reaction to form the cation and for reducing the cation may vary over wide limits, the rate of reaction varying with temperature. The yields appear not to be materially reduced by long-time maintenance of the reaction mixture under reaction conditions. Generally, it is preferred to maintain the reactants in both reactions under the desired reaction conditions for at least 15 minutes.

The ratio of reactants is not critical in either the reaction to produce the organo-metallic cation or the reaction whereby it is reduced to the non-ionic compound, and such ratios may be varied over wide limits. Generally in production of the cation we prefer to employ the aromatic reactant and the reducing agent in considerable excess, although stoichiometric amounts may be used with good results. In reduction of the cation we prefer to use a slight excess of the reducing agent.

This invention is broadly applicable to all of the transition elements, the stability of the organo-metallic cations and the non-ionic organo-metallic compounds differing for the various transition elements. The transition elements are those elements of the periodic system characterized by atoms in which an inner $d$ or $f$ level of electrons is present but not filled to capacity. The transition elements are Sc, Ti, V, Cr, Mn, Fe, Co, Ni, Y, Zr, Nb, Mo, Tc, Ru, Rh, Pd, La, Hf, Ta, W, Re, Os, Ir, and Pt, as well as the so-called inner transition elements comprising the rare earth or lanthanide and the actinide series.

The invention is particularly well adapted to the production of organo-metallic cations and non-ionic compounds of the type described in which the transition element is an element of the IVB, VB and VIB groups of elements and those elements of group VIII which contain a total of 8 $d$ and $s$ electrons in their valence orbitals. The invention is specifically adapted to the production of organo-metallic compounds of the type described in which the transition elements are those of group VIB of the periodic table, these elements forming particularly stable organo-metallic cations and non-ionic compounds. Each element of group VIIB has 5 electrons in the upper $d$ orbital electron shell. As is known, this is a particularly stable configuration and hence these elements present difficulty, not encountered with the neighboring VIB and VIII groups, in removal or shifting from the $d$ position of any electron. The halides of the VIIB elements, therefore, while reactive, do not react with the facility characteristic of the VIB group and the elements of group VIII which contain 8 $d$ and $s$ electrons in their valence orbitals.

As explained above, the organo-metallic cations are provided in aqueous solution in which they are soluble. They may be recovered therefrom by metathetical reaction with anions or by other recovery means as precipitation under non-reducing conditions by salting out or by adding to aqueous solutions containing the cation water miscible organic liquids in which the cation complex is insoluble.

As illustrative embodiments of a manner in which the invention may be practiced the following examples are presented:

*Example 1*

A tube is charged with 5 grams dry chromium (III) chloride, 0.7 gram dry aluminum powder, 3 grams sublimed, finely powdered aluminum chloride and 18 grams pure benzene. The tube, after cooling to about —20° C. is evacuated and sealed. It is then heated at 150° C. for 15 hours with shaking. After cooling to room temperature 30 grams methanol is slowly added to the reaction mixture with external cooling. This decomposes the aluminum chloride complex

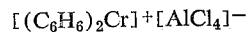
[$(C_6H_6)_2Cr$]+[$AlCl_4$]− as well as excess $AlCl_3$ and dissolved $CrCl_3$. Then 10 grams of water is added and the reaction mixture is filtered with exclusion of air. The filtrate separates in two yellow layers, one an aqueous layer and the other a benzene layer. The aqueous layer contains the major portion of the resulting dibenzene chromium (I) chloride.

For the preparation of the non-ionic compound, dibenzene chromium (0), a further 250 grams benzene and then a saturated aqueous solution of 30 grams sodium hydrosulfite are added to resulting reaction mixture. Then, gradually with stirring and cooling, a concentrated aqueous solution containing 50 grams potassium hydroxide is added and stirring is continued for 2 hours at room temperature. The brown benzene layer is separated and dried with potassium hydroxide under nitrogen. The benzene is evaporated and the crystalline dark brown residue sublimed at 130–160° C. under high vacuum. The dibenzene chromium (obtained in a yield of about 60% theory calculated from chromium (III)

chloride) melts in pure form at 284–285° C. and decomposes rapidly at the melting temperature.

Example 2

The non-ionic composition may be converted into ionic form by oxidation. Thus 1.85 grams of dibenzenechromium (0) is dissolved in 160 grams benzene, 15 grams of water is added and air bubbled through the mixture until the benzene layer is only a light yellow color. The orange colored aqueous layer, containing the dibenzenechromium cation, is separated and 3 grams finely powdered potassium iodide added to it. The resulting yellow precipitate is filtered, washed with alcohol and ether, and dried. Additional precipitate may be recovered by concentrating the filtrate. The dibenzenechromium iodide, like most dibenzenechromium (I) salts is stable to air in solid state as well as in neutral or weakly alkaline solution but it is slowly decomposed in acid solution. The same dibenzenechromium (I) iodide may be obtained by adding about one-half mole of iodine to a dry, ether solution of 1 mole of dibenzenechromium (0) under nitrogen.

Example 3

From the hydrolized filtrate obtained as explained in Example 1, the aqueous layer is acidified with acetic acid and an equal volume of 2 N solution of potassium perchlorate is added. A yellow precipitate, dibenzenechromium (I) perchlorate is formed and may be recovered by filtration while taking care to keep the precipitate moist. In dry state the compound is highly explosive.

Example 4

A mixture of 3 grams molybdenum (V) chloride, 3 grams sublimed aluminum chloride, 1 gram dry aluminum powder and 10 grams benzene are caused to react in the manner described in Example 1 by heating for 15 hours at 120–125° C. The reaction mixture is decomposed with cooling by adding 20 grams methanol and then with 75 grams water. The hydrolized mixture is filtered and the brown dibenzene molybdenum (I) chloride is contained in the aqueous layer of the filtrate.

To prepare the dibenzene molybdenum (0), 200 grams benzene is added to the filtrate, then under nitrogen 10 grams formamidine sulfinic acid and 60 grams concentrated ammonia are added slowly with stirring. The green benzene layer after several hours stirring under nitrogen is separated and dried over potassium hydroxide. After evaporating the benzene under reduced pressure, the dibenzene molybdenum (0) remains as a green crystalline residue and may be further purified by sublimation in a high vacuum at 100–105° C.

Example 5

In a vessel fitted with stirring means, a reflux condenser and a pressure release valve there is placed 10 grams anhydrous chromium (III) chloride, 1.4 grams dry aluminum powder, and 35 grams tetrahydronaphthalene. Then, in the absence of air and with cooling, 6 grams sublimed and powdered aluminum chloride is added and the mixture warmed with stirring for 5 hours at 150–180° C. with the valve closed. A brown, semi-solid mass is obtained which is treated with 30 grams methanol while cooling in an ice bath and then with enough 2 N aqueous NaOH to render the yellow aqueous layer weakly alkaline. The precipitate is filtered and washed with water. The combined deep yellow filtrate and wash are acidified with acetic acid, yielding the bis(tetrahydronaphthalene) chromium (I) acetate.

The picrate may be prepared by adding an aqueous solution of picric acid. After solution in acetone and precipitation with ether, small orange yellow crystals of bis(tetrahydronaphthalene) chromium (I) picrate are obtained. They explode on warming.

Addition of potassium iodide in place of picric acid yields bis(tetrahydronaphthalene) chromium (I) iodide as an egg yellow powder, slightly soluble in water.

Example 6

In a flask fitted as in Example 5 and protected with a slow stream of nitrogen, 3 grams anhydrous iron (III) chloride, 3 grams sublimed, finely powdered aluminum chloride and 40 grams dry, pure tetrahydronaphthalene are mixed. The mixture is kept under a nitrogen atmosphere and gradually warmed to 120° C. with stirring, and stirred for 4 hours at this temperature. The mixture is then cooled in an ice bath and 10 grams methanol (under nitrogen) and then 150 grams water is gradually added while continuing the cooling. The red-orange colored aqueous layer is separated and extracted twice with 50 grams petroleum ether.

The bis(tetrahydronaphthalene)iron (II) cation which remains in the aqueous solution is precipitated as the tetraphenylboron, by adding to the resulting weakly acid red-orange solution of bis(tetrahydronaphthalene) iron (II) chloride a solution of sodium tetraphenylboron. A salt of the composition

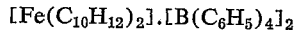

is precipitated as a red-brown precipitate.

Example 7

Following the manner described in Example 1, 18 grams of pure benzene, 3 grams sublimed AlCl$_3$, 0.7 gram dried Al powder, and 5 grams TiCl$_4$ are reacted. The aqueous phase of the filtrate following hydrolysis is a brown solution, and contains the dibenzenetitanium cation.

In a similar manner substituting ZrCl$_4$ for TiCl$_4$, a wine-red dibenzenezirconium solution is obtained. With VCl$_3$ a yellow solution containing the dibenzenevanadium cation is obtained.

Example 8

A mixture of 5 grams anhydrous chromium (III) chloride, 0.7 gram dry aluminum powder, 3 grams sublimed aluminum chloride and 9 grams purified diphenyl is gradually heated with stirring to 200–300° C. under nitrogen for 2 hours. After cooling to room temperature, methanol and water are added in the manner described in Example 5 above. The deep orange solution is filtered, aluminum and chromium hydroxide precipitated with aqueous NaOH and filtered off, and washed with water. The combined filtrate and wash is acidified with acetic acid and the resulting deep orange yellow solution of bis(diphenyl) chromium (I) acetate is concentrated by evaporation under reduced pressure.

Upon addition of picric acid solution, the bis(diphenyl) chromium (I) picrate precipitates as an orange red solid.

Example 9

8 grams of dibenzenechromium (0) (prepared as in Example 1) is suspended in 800 grams of water and air bubbled in for 2 hours, completing oxidation of dibenzene chromium to the dibenzenechromium cation. The air is then replaced by nitrogen and a solution of sodium cyclopentadienyl tricarbonyl chromium is added. The sodium cyclopentadienyl tricarbonyl chromium was prepared by the reaction of 10 grams dicyclopentadienyl chromium with hydrogen and carbon monoxide at 70° C. and 200 atm. pressure, then dissolved in 500 grams nitrogen-saturated 1 N NaOH (according to E. O. Fischer, et al., Z. fur anorg. u. allgem. Chemie 282, 56 (1955)). There resulted a good yield of a greenish yellow solid of the salt-like compound dibenzenechromium (I) cyclopentadienyl chromium tricarbonylate, having the composition

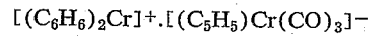

The product may be purified by subliming at 125–130° C. in high vacuum.

Example 10

In a vessel provided with stirring means, fitted with a reflux condenser and under a blanket of nitrogen 40 grams of dry mesitylene, 3 grams anhydrous iron (II) bromide and 3 grams anhydrous, finely powdered aluminum chloride are mixed and warmed with stirring. The reaction starts at about 65–70° C. and the mixture is heated for 4 hours at 80–90° C. The reaction mixture is then cooled in an ice bath and 10 grams methanol and then 150–200 grams water are added to effect hydrolysis. The red-orange weakly acidic aqueous solution is separated from the unreacted mesitylene by decantation and extracted 3 times with about 50 grams petroleum ether. The resulting aqueous solution contains the dimesitylene iron (II) cation which can be precipitated as the tetraphenylboron derivative by addition of a solution containing 1 gram sodium tetraphenylboron to the weakly acidic aqueous solution. The salt thus precipitated has the composition $$[(C_6H_3(CH_3)_3)_2Fe] \cdot [B(C_6H_5)_4]_2$$

and forms red orange needles upon solution in acetone and precipitation with ether. The yield amounts to about 30% of theory.

Example 11

In a vessel fitted with stirring means and with a reflux condenser and protected from air by a slow stream of nitrogen, 20 grams completely dry chromium (III) chloride, 200 grams toluene, 12 grams sublimed aluminum chloride and 3 grams dry aluminum powder are placed and the mixture warmed to a gentle reflux for 20 hours. After cooling in an ice bath 100 grams methanol is added and the mixture made weakly alkaline with dilute aqueous ammonia. The resulting thick paste is filtered and extracted several times by boiling with a total of 500 grams water, and the combined filtrates concentrated to about 300 grams.

This solution, containing air-stable ditoluene chromium (I) chloride is covered with 250 grams petroleum ether under nitrogen. An aqueous solution of 100 grams sodium hydrosulfite is added with stirring and then gradually over the course of 2 hours an aqueous solution of 150 grams potassium hydroxide is added. The dark brown petroleum ether layer, which contains the resulting ditoluene chromium (0) is dried over potassium hydroxide in a nitrogen atmosphere. The solvent is then evaporated and the brownish black residue carefully sublimed in high vacuum at about 110° C. The yield of pure ditoluene chromium amounts to 9–10 grams.

Example 12

In a vessel equipped with stirring means and protected from the air by nitrogen, 45 grams anhydrous ruthenium (III) chloride, 5 grams dry aluminum powder, 150 grams pure diphenyl and 23 grams sublimed aluminum chloride are added and the mixture warmed with stirring. The mixture begins to melt at about 70° C. and is heated to 150° C. for about 15 minutes, until a small portion of the dark brown melt yields a red brown solution when tested with methanol. After cooling to ice bath temperature, 100 grams methanol is added with stirring and continued cooling, and then 400 grams water is added. The mixture is made slightly alkaline with aqueous NaOH and filtered. The reddish brown filtrate contains the bis(diphenyl)ruthenium (II) chloride. The solution is not stable in air but it may be treated with alkali metal pictrates, perchlorates or iodides to form the corresponding salt of bis(diphenyl)ruthenium (II) cation as yellow, difficultly soluble, stable precipitates. The bis(diphenyl)-ruthenium II-bis-(tetraphenylboron) obtained by reaction with sodium tetraphenylboron has the formula $$[(C_6H_5-C_6H_5)_2Ru] \cdot [(C_6H_5)_4B]_2$$

It is yellow brown and very stable in air.

Example 13

In a flask equipped with stirring means and swept by nitrogen 10 grams dry chromium (III) chloride, 1.2 grams dry aluminum powder, 20 grams sublimed diphenyl and 6 grams sublimed aluminum chloride are placed and the mixture carefully warmed with stirring to about 140° C., until a small portion of the brown melt gives a dark yellow colored solution when tested with a little methanol. This usually requires about 10 minutes. If the methanolic test is colored greenish or is colorless the melt must be further heated. The mixture is cooled to 50° C. and 100 grams methanol then 400 grams distilled water added. The mixture is made weakly alkaline with ammonia, heated to 70° C. and the solids filtered off. The solids are washed with water until they contain no more yellow bis(diphenyl)chromium (I) hydroxide.

The combined reddish yellow filtrates are extracted with benzene to remove the unreacted diphenyl, then made weakly acidic with acetic acid and treated with saturated potassium iodide solution. Thereby most of the resulting bis(diphenyl)chromium (I) iodide precipitates. After standing for several hours, the fine precipitate is filtered off; additional amounts of product may be obtained as a chloroform addition product from the filtrate by extraction with chloroform. The chloroform may be removed from the extract under reduced pressure.

The iodide may be purified by solution in acetone and precipitation with ether. It forms a yellow powder melting at 157° C. after being dried under high vacuum in the absence of light. The powder is stable in air but slightly light sensitive.

Example 14

The aqueous solution of bis(diphenyl)chromium (I) hydroxide (from Example 13) is treated with an excess of ammonia under a slow stream of nitrogen, covered with benzene and then treated with an excess of aqueous solution of formamidine sulfinic acid with stirring. The orange yellow benzene layer is separated and dried with KOH. After evaporation of the benzene, the bis(diphenyl) chromium remains as a dark colored light sensitive mass. It is obtained in the form of dark orange colored crystals melting at 112° C. by subliming under a high vacuum in the dark. It is readily soluble in organic solvents and the solutions are stable under nitrogen but unstable in air.

Example 15

To a flask protected by a slow stream of nitrogen 5 grams dry chromium (III) chloride, 35 grams mesitylene and 17 grams triethyl aluminum were added and the mixture stirred and warmed for six hours to 45° C. but not higher than 50° C. Then the mixture, while cooling in an ice bath was carefully treated first with methanol and then water as in Example 11. The resulting black solid was filtered off and the aqueous filtrate covered with benzene and reduced with sodium hydrosulfite and aqueous NaOH as in Example 1. The yellow benzene solution contained the resulting dimesitylene chromium (0), which was obtained in the form of yellow crystals by evaporating the benzene and subliming the residue under high vacuum at 70° C.

Example 16

One reacts as in Example 13 under nitrogen 9 grams dry $CrCl_3$, 5 grams $AlCl_3$, 1.2 grams dry Al powder and 30 grams of mesitylene, while gradually heating the mixture to 130–140° C. and stirring 20 hours at this temperature. The $AlCl_3$ is then decomposed with strong cooling with 50 grams methanol and then 40 grams of ice water is added. The reaction mixture is filtered and the yellow aqueous layer, which contains the di-(mesitylene)chromium (I) chloride is separated and extracted several times with ether, in order to remove impurities.

The yellow aqueous solution under nitrogen is covered with 300 grams benzene and with stirring an aqueous suspension of 40 grams sodium hydrosulfite is slowly added and while cooling in an ice bath a saturated aqueous solution of 100 grams KOH is added. After 2 hours standing at room temperature, the brown benzene layer is separated in the absence of air and dried over KOH. Then the solvent is distilled at ordinary temperature in vacuo and the dark residue is sublimed in high vacuum at about 120° C.

The dimesitylene chromium (0) thus obtained forms plates and needles which in thin section are yellow but in bulk are dark brown, and have a melting point of 117–118° C. In an inert atmosphere the compound decomposes at 270° C. with the formation of a chromium mirror. The compound is quite sensitive to air and should be handled under nitrogen or other inert gas.

Example 17

For the preparation of pure salts of dimesitylene chromium (I) cation one suspends the dimesitylene chromium in water and passes air through the suspension until solution occurs. Various salts may be formed by treating this solution, for example, with perchloric acid to form the perchlorate, with KI to form the iodide, with picric acid to form the picrate, with Reinecke acid to form the Reineckate and with sodium tetraphenylboron to form the tetraphenylboron. All of these are very slightly soluble in water.

Example 18

Under nitrogen, 10 grams dry $CrCl_3$ with 1.6 grams dried Al and 20 grams hexamethylbenzene are heated cautiously with stirring up to the melting point of hexamethylbenzene. Then 20 grams of sublimed $AlCl_3$ is added. The mixture is heated to 200° C. in a bath for 4–5 hours with vigorous stirring and then cooled. Then with cooling 30 grams methanol is added and then in small portions 60 grams of nitrogen-saturated water. The undissolved portion is removed by filtration through a fritted glass filter and the dark brown filtrate is extracted twice with ether.

The acid solution of bis(hexamethylbenzene)Ci(I)Cl thus obtained is rather unstable but it can be stabilized by rendering solution slightly alkaline. This may be accomplished by adding acetic acid and sodium acetate to buffer the solution at a slightly alkaline pH. From such solution one may precipitate, by addition of the appropriate solutions, the difficultly soluble iodide, picrate, Reineckate or tetraphenylboron.

For conversion into the non-ionic bis(hexamethylbenzene)chromium (0) the aqueous solution containing the cation is maintained under nitrogen and covered with 250 grams benzene. Then 30 grams sodium hydrosulfite is added and with cooling and vigorous stirring 50 grams pulverized KOH are then added. As soon as the aqueous layer is nearly colorless, the brown benzene layer is separated and dried under nitrogen with KOH. Then the benzene is distilled under high vacuum, at as low a temperature as possible, and the residue is cautiously sublimed in a high vacuum. After a forerun of colorless hexamethylbenzene, the brown crystals of bis(hexamethylbenzene)chromium (0) pass over at a bath temperature of 130–170° C. The residue is spontaneously inflammable in the air.

The sublimed bis(hexamethylbenzene)chromium (0) is quite soluble in acetone and in benzene, little soluble in petroleum ether. It is quite unstable in air. In nitrogen atmosphere its decomposition point lies at temperatures above 210° C. Addition of water to the benzene solution of the compound and passage of air through it, results in a brown aqueous solution of bis(hexamethylbenzene)chromium (I) hydroxide.

Example 19

Under nitrogen and in a container equipped with a reflux condenser and a high pressure valve, 2 grams of dry $CrCl_3$, 4 grams of sublimed $AlCl_3$, 0.5 gram of dry Al powder and 35 grams of o-xylene are added and heated to boiling under reflux for 12 hours. Then with cooling, sufficient methanol is slowly added until a clear solution occurs, then 30 grams of water, and the mixture is allowed to stand for 30 minutes. The aqueous layer is separated and extracted twice with ether and then neutralized to a pH value of 7–7.5 with 2 N NaOH. The solution is filtered and the filtrate is a clear yellow solution which contains the bis(o-xylene) $Cr^+$ cation. The cation can be precipitated from the solution made weakly acidic with acetic acid by adding sodium tetraphenylboron. The precipitate is a yellow stable solid of the composition

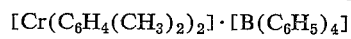

$$[Cr(C_6H_4(CH_3)_2)_2] \cdot [B(C_6H_5)_4]$$

With sodium perchlorate one obtains the corresponding yellow perchlorate, with sodium benzoate the yellow benzoate, with sodium phenylate the stable, clear yellow, soluble phenylate.

Example 20

According to Example 1, 4 grams anhydrous $CrCl_3$, 0.8 gram dry aluminum powder, 7 grams sublimed, finely powdered $AlCl_3$ and 10 grams anhydrous m-xylene heated in a sealed tube were added, under agitation at about 200° C. for 30 hours. The reaction mixture under cooling is cautiously hydrolized with 30 grams $CH_3OH$ and 70 grams $H_2O$. The aqueous layer is separated and extracted twice with ether and then filtered. Enough sodium acetate is added to render the solution slightly alkaline and sodium tetraphenylboron is added, resulting in precipitation of shining bis(m-xylene)chromium tetraphenylboron.

Example 21

As in example 1, 2 grams $CrCl_3$, 0.5 gram Al powder, 4 grams sublimed $AlCl_3$, and 40 grams dry p-xylene are charged into a sealed tube and heated for 12 hours at 250° C. with agitation. The reaction mixture is treated as described in Example 20. The bis(p-xylene)chromium (I) cation likewise forms yellow, slightly soluble precipitates with sodium tetraphenylboron, potassium iodide, Reinecke salts and sodium perchlorate.

Example 22

In a vessel, under nitrogen, 3.17 grams anhydrous chromium (III) chloride with 0.54 gram dry Al powder and 10 grams hexamethylbenzene are mixed and heated to about 170° C. Then 45 grams anhydrous $AlBr_3$ is added. After stirring at 170° C. for 4 hours under nitrogen the mixture is cooled and cautiously hydrolized with 30 grams methanol and then 100 grams of water saturated with nitrogen.

The aqueous solution, which contains the di(hexamethylbenzene)chromium (I) cation, is separated, shaken twice with ether and then covered with 250 grams of benzene. In a nitrogen stream with stirring and cooling 15 grams sodium hydrosulfite and then 30 grams solid potassium hydroxide is added. After 2 hours of stirring the benzene layer is separated and distilled under nitrogen to remove the benzene. About 1 gram di(hexamethylbenzene)chromium (0) is obtained. This can be purified through sublimation in a high vacuum at 150° C. It shows the same properties as the product prepared in Example 18.

Example 23

As in Example 1, 7.5 grams $CrCl_3$, 10 grams Al powder, 2.8 grams anhydrous $AlF_3$ and 22.5 grams dry benzene are reacted by heating in a sealed tube with agitation for 48 hours at 200° C. After cooling, the reaction mixture is decomposed under further cooling with 45 grams methanol and then with 25 grams water. The hydrolized mixture is filtered through glass wadding into a vessel with stirrer and there is added to the filtrate 350 grams benzene and a saturated aqueous solution of 45 grams sodium hydrosulfite and then a saturated aqueous solution of 75 grams KOH is gradually added while maintaining cooling and stirring. After 2 hours stirring at 20° C. the brown benzene layer is worked up as in Example 1. One obtains about 1.5 grams of dibenzenechromium (0).

*Example 24*

In a sealed tube 5 grams $CrCl_3$, 5 grams dry zinc dust, 5 grams aluminum chloride and 30 grams anhydrous benzene, are heated with agitation for 15 hours at 150° C. as in Example 1. The reaction mixture is worked up as in Example 1 with similar results and yields. Employment of 2.5 grams of magnesium powder instead of zinc dust gives similar results and yields.

*Example 25*

In a sealed tube 5 grams anhydrous $CrCl_3$, 0.7 gram dry Al powder, 3 grams sublimed, finely powdered $AlCl_3$ and 15 grams anhydrous benzene, are heated for 15 hours at 150° C. with agitation. In the absence of air, the reaction mixture is cooled in an ice bath and five times its volume of anhydrous tetrahydrofuran is added, the resulting yellow solution is filtered through asbestos wool, washed with tetrahydrofuran and cooled to 10° C. and three times its volume of absolute ether is added with stirring. There precipitates, in a yield of about 60% of theory, dibenzenechromium (I) tetrachloroaluminate of the formula $[Cr(C_6H_6)_2]^+[AlCl_4]^-$ in the form of lustrous yellow crystals.

*Example 26*

As in Example 1, 7 grams $WCl_6$, 1 gram Al powder, 3 grams sublimed $AlCl_3$ and 20 grams anhydrous benzene are heated in an evacuated sealed tube with agitation for 24 hours at 140° C. After cooling, the dark reaction mixture, under nitrogen, is cautiously hydrolized with 100 grams of nitrogen saturated water. The red-brown solution recovered by filtration from the undissolved residue is extracted several times with benzene and then covered with ether. With stirring and cooling and in the absence of air sodium hydrosulfite and KOH solution are added. The red-brown ether layer is separated from the aqueous layer and dried under nitrogen with solid KOH and the ether then removed in vacuum. The brown residue is carefully sublimed in a high vacuum at about 60° C. The sublimate is bis(benzene)tungsten (0) and is obtained in the form of yellow crystals which are very sensitive to air and heat and which ignite in air.

The organo-metallic compounds and cations of this invention vary in heat stability but they may all be decomposed by the employment of temperatures in excess of 400° C. Such thermal decomposition of the compounds results in formation of metallic mirrors comprising a coating or film of the particular transition element. Such metallic coatings and films exhibit desirable and useful electrical conductance properties, furnish corrosion protection when applied to corrodible base materials and result also in striking decorative effects. Employment of a complex of the cation with a heat decomposable metal-containing anion results in deposition of a mixed metallic mirror. Compounds of this invention may thus be deposited on glass, glass cloth, resin and other insulating substrates, and the resulting metal-coated material may be employed as strip conductors and resistors for electrical purposes. The metals may be deposited by thermal decomposition in desired portions of the substrate, employing conventional methods, to provide the so-called printed electrical circuits. Similarly the metals may be plated on metal substrates to enhance corrosion resistance and on glass cloth or asbestos to provide decorative metallic surfaces and designs thereon. It is preferred in deposition of metals by thermal decomposition of compounds of this invention to employ inert gases, such as argon, as a protective or blanket gas to minimize the oxidation by air or oxygen.

Deposition on glass cloth illustrates the methods employed. Two strips of glass cloth are dried in an oven at 150° C. for one hour, after which they weighed 0.8503 and 0.8915 g. Then, together with 0.2 g. of bis(benzene)chromium, they were sealed in an evacuated glass tube and heated at 400° C. for one hour.

The tube was cooled and opened and the cloth had a uniform metallic gray appearance. Gains in weight of the glass cloth were 0.0190 and 0.0189 g. The cloth had a resistivity of approximately 2 ohms/cm. Each individual fiber was found to be conducting. Application of voltage across the cloth gave a rise in temperature as would be expected. Thus a conducting cloth has been prepared. This may be used for reduction of static charge, for decoration, reflective thermal insulation, protection and to provide a heating element.

In a glass tube were placed 1.5 g. of dibenzene chromium, small glass rings, small pieces of copper and a stainless steel wrench. The tube was evacuated and sealed. It was then heated at 380° C. for 30 min., after which it was cooled and opened. The inner surface of the glass tube and the surface of the glass rings were coated with an adhering plate of chromium metal. The copper objects were similarly plated with an adhering coat as was the stainless steel wrench.

Chemical entities of this invention may be utilized for depositing on suitable carriers the respective transition element materials in catalytic form. Thus, compounds of this invention may be thermally decomposed by employment of temperatures from 80° C. to 400° C., preferably under argon or other inert gas, as for example, krypton, to provide supported transition element catalysts in catalytically active form, and particularly those of groups IVB, VB, VIB, of the periodic table and elements of group VIII in the periodic table which contain 8 electrons in their orbital electron shells. Other conventional methods may be employed for depositing metallic catalysts employing chemical entities of this invention. An aqueous solution of dibenzene molybdenum tetrachloroaluminate complex $[(C_6H_6)_2Mo] \cdot [AlCl_4]$ may be mixed with diatomaceous earth, the complex being adsorbed on the diatomaceous earth. The adsorbate is recovered by filtration and heated in air to the decomposition temperature of the complex. The organometallic compounds decompose to give a catalytically active mixture of molybdena and alumina. This catalyst is useful for the vapor phase dehydration of alcohol and for the isomerization and cracking of petroleum fractions at temperatures of 300–600° C. Other transition elements may similarly be deposited in catalytic form. Also, the catalyst may be deposited on alumina. Mixed or promoted catalysts may be produced.

As is readily understood the differences in stability and solubility can be used to advantage in separation procedures. As an example, chromium can be separated from iron, using the halides. Such a mixture of chromium and iron halides is treated according to Example 1. After the hydrolysis step the mixture is treated with zinc plus dilute acetic acid. Under these conditions the bis(benzene) chromium cation is reduced to the neutral state and passes from the aqueous phase into the benzene phase while the bis(benzene) iron dichloride is not reduced and remains in the aqueous phase. The benzene layer is then separated and evaporated at about 40° C. under reduced pressure, and the residue which remains is sublimed at 140–160° C. under high vacuum yielding pure bis(benzene) chromium. The chromium metal can then be recovered by heating the organo-metallic compounds to above 300° C. under an inert atmosphere such as argon and krypton.

Chemical entities of this invention, particularly the cationic entities, may also be employed for depositing metals on heat resistant substrates by thermally decomposing compounds containing the cation in a slow stream of hydrogen at temperatures of 750–1000° C. A coating of transition element or mixture of transition element and metal of the anion results.

Having described our invention, what we claim as new and desire to secure by Letters Patent is:

1. A process for producing a cationic organo-transition element chemical entity which comprises reacting in liquid phase under anhydrous conditions an organic aromatic hydrocarbon compound selected from the group consisting of an aromatic hydrocarbon compound having an isolated benzene ring and aryl substituted benzenes, a transition element halide and an aluminum halide.

2. A process for producing organo-metallic compounds which comprises reacting an organic aromatic hydrocarbon compound selected from the group consisting of aromatic hydrocarbons having an isolated benzene ring and aryl substituted benzenes, a transistion element halide wherein the transition element is a member of groups IVB, VB, VIB, and that portion of group VIII which contain a total of eight $d$ and $s$ electrons in the valence shells, and an aluminum halide, hydrolyzing the resulting reaction mixture, reducing the hydrolized reaction mixture and recovering therefrom the organo-metallic compound.

3. A process for producing organo-metallic compounds which comprises (1) forming a reaction mixture containing a cationic organo-transition element addition entity by reacting an organic aromatic hydrocarbon compound selected from the group consisting of aromatic hydrocarbon compounds having an isolated benzene ring and aryl substituted benzenes, a transition element halide wherein the valence of the transition element is higher than the valence of that element in the desired organo-transition element cationic entity, an aluminum halide and a reducing agent, (2) hydrolyzing said reaction mixture and (3) reducing the organo-transition element cation contained in the hydrolyzed reaction mixture to a lower valence state.

4. A process for producing a cationic organo-transition element chemical entity which comprises reacting in liquid phase under anhydrous conditions an organic aromatic hydrocarbon compound having an isolated benzene ring, a group VIB transition element halide wherein the valence of the transition element is higher than the valence of that element in the desired organo-transition element cationic entity, an aluminum halide and a reducing agent.

5. A process for producing a cationic organo-transition element chemical entity which comprises reacting in liquid phase under anhydrous conditions an organic aromatic hydrocarbon compound having an isolated benzene ring, a transition element halide wherein the valence of the transition element is that of the element in the desired organo-metallic cationic entity, and an aluminum halide.

6. A process for producing a cationic organo-transition element chemical entity which comprises reacting in liquid phase under anhydrous conditions tetrahydronaphthalene, a transition element halide and an aluminum halide.

7. A process for producing a cationic organo-transition element chemical entity which comprises reacting in liquid phase under anhydrous conditions tetrahydronaphthalene, chromium chloride and an aluminum halide.

8. A process for producing a cationic organo-transition element chemical entity which comprises reacting in liquid phase under anhydrous conditions benzene, a transition element halide and an aluminum halide in the presence of a reducing agent.

9. A process for producing a cationic organo-transition element chemical entity which comprises reacting in liquid phase under anhydrous conditions mesitylene, a transition element halide and an aluminum halide in the presence of a reducing agent.

10. A process for producing a cationic organo-transition element chemical entity which comprises reacting in liquid phase under anhydrous conditions a xylene, a transition element halide and an aluminum halide in the presence of a reducing agent.

11. A process for producing a cationic organo-transition element chemical entity which comprises reacting in liquid phase under anhydrous conditions benzene, a transition element halide and an aluminum halide in the presence of powdered metallic aluminum.

12. A process for producing a cationic organo-transition element halide chemical entity which comprises reacting in liquid phase under anhydrous conditions benzene, a transition element and an aluminum halide in the presence of powdered metallic zinc.

13. A process for producing a cationic organo-transition element chemical entity which comprises reacting in liquid phase under anhydrous conditions a compound selected from the group consisting of organic aromatic hydrocarbon compounds having an isolated benzene ring and aryl substituted benzenes, a chromium halide and an aluminum halide in the presence of a reducing agent.

14. A process for producing bis(benzene)chromium cations which comprises reacting in liquid phase under anhydrous conditions benzene, chromic chloride and aluminum chloride in the presence of powdered metallic aluminum.

15. A process for producing a cationic organo-transition element chemical entity which comprises reacting in liquid phase under anhydrous conditions a compound selected from the group consisting of organic aromatic hydrocarbon compounds having an isolated benzene ring and aryl substituted benzenes, a molybdenum halide and an aluminum halide in the presence of a reducing agent.

16. A process for producing a cationic organo-transition element chemical entity which comprises reacting in liquid phase under anhydrous conditions a compound selected from the group consisting of organic aromatic hydrocarbon compounds having an isolated benzene ring and aryl substituted benzenes, a ruthenium halide and an aluminum halide in the presence of a reducing agent.

17. A process for producing a cationic organo-transition element chemical entity which comprises reacting in liquid phase under anhydrous conditions an organic aromatic hydrocarbon compound selected from the group consisting of organic aromatic hydrocarbon compounds having an isolated benzene ring and aryl substituted benzenes, an iron halide and an aluminum halide in the presence of a reducing agent.

18. A process for producing a cationic organo-transition element chemical entity which comprises reacting in liquid phase under anhydrous conditions an organic aromatic hydrocarbon compound selected from the group consisting of organic aromatic hydrocarbon compounds having an isolated benzene ring and aryl substituted benzenes, a tungsten halide and an aluminum halide in the presence of a reducing agent.

19. A process for producing a cationic organo-transition element chemical entity which comprises reacting in liquid phase under anhydrous conditions an organic aromatic hydrocarbon compound selected from the group consisting of organic aromatic hydrocarbon compounds having an isolated benzene ring and aryl substituted benzenes, a titanium halide and an aluminum halide in the presence of a reducing agent.

20. A process for producing cationic organo-metallic entities which comprises suspending in an oxygen-stable aqueous liquid a non-ionic organo-metallic compound having the empirical formula

wherein Ar represents an organic hydrocarbon compound selected from the group consisting of organic hydrocarbon compound containing an isolated benzene ring and aryl substituted benzenes and M is a transition element, and contacting said suspension with an oxygen containing gas.

21. Process in accordance with claim 20 wherein said transition element, M, is selected from the group consisting of chromium, molybdenum and tungsten.

References Cited in the file of this patent

UNITED STATES PATENTS

| | | |
|---|---|---|
| 1,912,878 | Zchimmer | June 6, 1933 |
| 2,408,187 | Atwell | Sept. 24, 1946 |

OTHER REFERENCES

J. Inorg. Nucl. Che., 1956, vol. 3, p. 104.
J.A.C.S. 78, No. 22, Nov. 20, 1956, page 5959.